United States Patent [19]
Asatsuke et al.

[11] Patent Number: 5,154,099
[45] Date of Patent: Oct. 13, 1992

[54] HYDRAULIC CONTROL DEVICE FOR AN AUTOMATIC AUTOMOTIVE TRANSMISSION SYSTEM

[75] Inventors: Shoji Asatsuke; Kazuma Hatakeyama; Shyoji Arai; Tetsuya Mochizuki, all of Saitama, Japan

[73] Assignee: Honda Giken Kogyo Kabushiki Kaisha, Tokyo, Japan

[21] Appl. No.: 774,093

[22] Filed: Oct. 11, 1991

[30] Foreign Application Priority Data

Oct. 15, 1990 [JP] Japan ................... 2-275753
Jan. 11, 1991 [JP] Japan ................... 3-13982

[51] Int. Cl.$^5$ ............................................. B60K 41/06
[52] U.S. Cl. ............................................. 74/867
[58] Field of Search ........................... 74/867, 868

[56] References Cited

U.S. PATENT DOCUMENTS

| | | | |
|---|---|---|---|
| 3,774,629 | 11/1973 | Enomoto | 74/867 X |
| 4,265,346 | 5/1981 | Emmadi | 74/867 X |
| 4,858,501 | 8/1989 | King | 74/867 X |
| 4,890,517 | 1/1990 | Ueki et al. | 74/867 X |
| 4,934,218 | 6/1990 | Takase et al. | 74/868 |
| 4,938,103 | 7/1990 | Sugano | 74/867 |
| 4,972,739 | 11/1990 | Ueki et al. | 74/867 X |
| 5,022,285 | 6/1991 | Suzuki | 74/867 X |
| 5,088,356 | 2/1992 | Takahashi | 74/867 X |
| 5,092,199 | 3/1992 | Goto et al. | 74/867 X |

FOREIGN PATENT DOCUMENTS

| | | |
|---|---|---|
| 48-20655 | 6/1973 | Japan . |
| 49-40585 | 11/1974 | Japan . |
| 61-84450 | 4/1986 | Japan . |
| 2-134456 | 5/1990 | Japan . |

Primary Examiner—Rodney H. Bonck
Assistant Examiner—Ryan Massey
Attorney, Agent, or Firm—Armstrong, Nikaido, Marmelstein, Kubovcik & Murray

[57] ABSTRACT

An oil ejection control valve is interposed in a first hydraulic engagement element of an automatic transmission system from which oil is ejected when a certain speed stage shifting operation is to be carried out. The oil ejection control valve is provided with a valve member which is normally biased to a closed position by a spring. The valve member is provided with a first pressure receiving surface to which the ejection pressure from the first hydraulic engagement element is applied and a second pressure receiving surface to which the supply pressure to a second hydraulic engagement element is applied during the afore-mentioned shifting operation, the second hydraulic engagement element being the one to which pressure is supplied so as to engage the same during the speed stage shifting operation. Since the ejection pressure can favorably contribute to the reduction in the engagement pressure of the first hydraulic engagement element that is about to be disengaged without waiting for the engagement pressure for the second hydraulic engagement element to be engaged to build up, a smooth shifting operation is made possible either in an upshift operation or a downshift operation, and a transmission shock can be avoided at all time.

7 Claims, 7 Drawing Sheets

HYDRAULIC CONTROL DEVICE FOR AN AUTOMATIC AUTOMOTIVE TRANSMISSION SYSTEM

TECHNICAL FIELD

The present invention relates to a hydraulic control device for an automatic automotive transmission system which automatically and hydraulically controls the shifting of the speed stages of an automatic transmission system suitable for use in motor vehicles in general.

BACKGROUND OF THE INVENTION

Conventionally, automatic transmission systems are widely used in automotive vehicles so that the shifting operation of the transmission may be hydraulically controlled, and there are those which carry out an transmission operation according to the vehicle speed and the throttle opening serving as a parameter representing the engine load according to prescribed transmission characteristics In such automatic transmission systems, when carrying out a downshift transmission operation from a high speed stage to a low speed stage by depressing an accelerator pedal or by a kick-down operation, the shock due to the abrupt change in the transmitted torque can be mitigated by appropriately increasing the rotational speed of the engine according to the gear ratio of the low speed stage and synchronizing the gears that are about to be meshed with each other.

For instance, as disclosed in Japanese patent publication (kokoku) No. 49-40585 (corresponding to British patent application No. 21353/69 filed in the name of Borg-Warner Limited), there is known the oil ejection control valve (refer to the 2-3 ejection valve 37 in FIG. 5 and the 3-4 ejection valve 38 in FIG. 7) which opens up an oil ejection passage for ejecting oil from an hydraulic engagement element for the high speed stage when the pressure supplied to another hydraulic engagement element for the low speed stage has reached a prescribed level. Japanese patent laid open publication (kokai) No. 61-84450 teaches a similar ejection valve which is placed in an oil ejection passage for an hydraulic engagement element for a high speed stage and is provided with a valve member which is displaced so as to open the oil ejection passage either by the supply pressure of a hydraulic engagement element for a low speed stage or the supply pressure of a hydraulic engagement element for an intermediate speed stage so that the reduction of the transmission shock may be effected even when the transmission gear unit is downshifted by two speed stages at a time, for instance from a fourth speed stage to a second speed stage.

Figure 3:
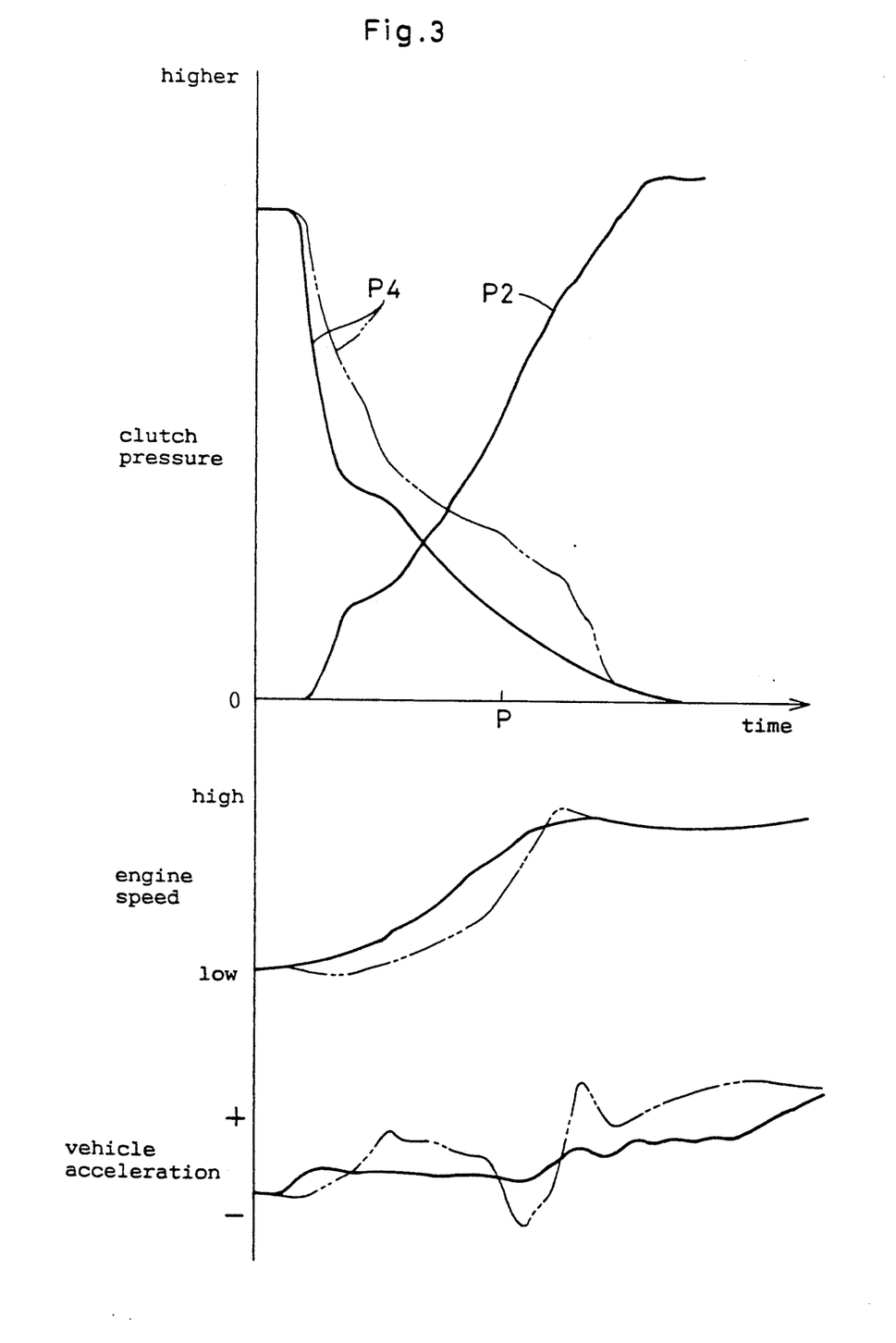
FIG. 3 is a diagram showing the transmission operation of the first embodiment of the present invention.

When a kick-down operation is to be made in such an automatic transmission system to shift the speed stage from the high speed stage which, for instance, consists of a fourth speed stage to the low speed stage which, for instance, consists of a second speed stage, the engagement pressure P4 of the fourth speed clutch serving as the hydraulic engagement element for the high speed stage changes as indicated by the imaginary line in the upper part of FIG. 3. In this case, the initial decrease in the engagement pressure P4 is brought about by a narrowed passage such as a fixed orifice provided in an oil ejection passage of the fourth speed clutch, and progresses in a relatively gradual manner. The subsequent reduction in the engagement pressure is also carried out in a gradual manner because the ejection of the pressure of an accumulator associated with the fourth speed clutch for mitigating the shock of clutch engagement proceeds at the same time. As the valve member which has been biased by a spring in the direction to close the oil ejection passage is displaced with the increase in the engagement pressure P2 of the second speed clutch which acts upon a land of the valve member against this spring force, the oil ejection control valve opens up (as indicated by P in the drawing). In other words, since the ejection of the oil is carried out by the oil ejection control valve in addition to the fixed orifice once the point P is reached, the flow resistance in the oil ejection passage is substantially reduced, and the engagement pressure P4 of the fourth speed clutch is relatively rapidly reduced from the time of opening the valve before the engagement pressure P4 is completely removed.

The engagement pressures P2 and P4 of the two clutches are supplied and ejected as described above, and the rotational speed of the engine also changes accordingly as indicated by the imaginary line in the middle part of FIG. 3. The increase in the rotational speed of the engine is gradual in the initial part of the transmission operation, and this is due to the fact that the ejection of pressure from the fourth speed clutch occurs in a gradual manner and the engagement condition of the fourth speed stage allows torque to be transmitted to a certain extent. Thereafter, since the engagement force declines as pressure is removed from the fourth speed clutch, and the engagement pressure of the fourth speed clutch sharply declines by the opening of the oil ejection control valve, the rotational speed of the engine rises sharply. The acceleration of the vehicle body G also changes from a negative value to a positive value as indicated by the imaginary line in the lower part of the drawing and the resulting transmission shock is transmitted to the vehicle occupant because the decline in the engagement pressure of the fourth speed clutch and the rise in the engagement pressure of the second speed clutch are both sharp or abrupt.

In such an automatic transmission system, a similar problem exists when an upshift operation is made from a low speed stage such as a second speed stage to a high speed stage such as a third speed stage. When an oil ejection control valve placed in an oil ejection passage of the hydraulic engagement element for the low speed stage is activated and the oil pressure of the hydraulic engagement element for the low speed stage is ejected, since the engagement pressure for the clutch which constitutes the hydraulic engagement element for the low speed stage or a second speed stage makes a sudden change, as illustrated in the conventional example indicated by the imaginary line in the upper part of FIG. 5, at the same time as the engagement pressure of the hydraulic engagement element for the high speed stage or a third speed stage reaches a prescribed level and the oil ejection control valve is activated (as indicated by P in the drawing), a relatively large change occurs in the vehicle acceleration and the slip ratio in the hydraulic engagement element for the high speed stage as indicated by the imaginary lines in the middle and lower parts of FIG. 5, and this produces a transmission shock.

Since the property of the oil ejection control valve is normally designed so as to minimize the transmission shock when an upshift is made under a load condition in which the accelerator pedal is depressed to a certain extent (power-on upshift), this transmission shock tends to be pronounced when an upshift is made in a light load condition in which the accelerator pedal is substantially released and a relatively large change in the transmission torque occurs because an engine drive situation changes into an engine brake situation by the upshift operation.

Figure 7:
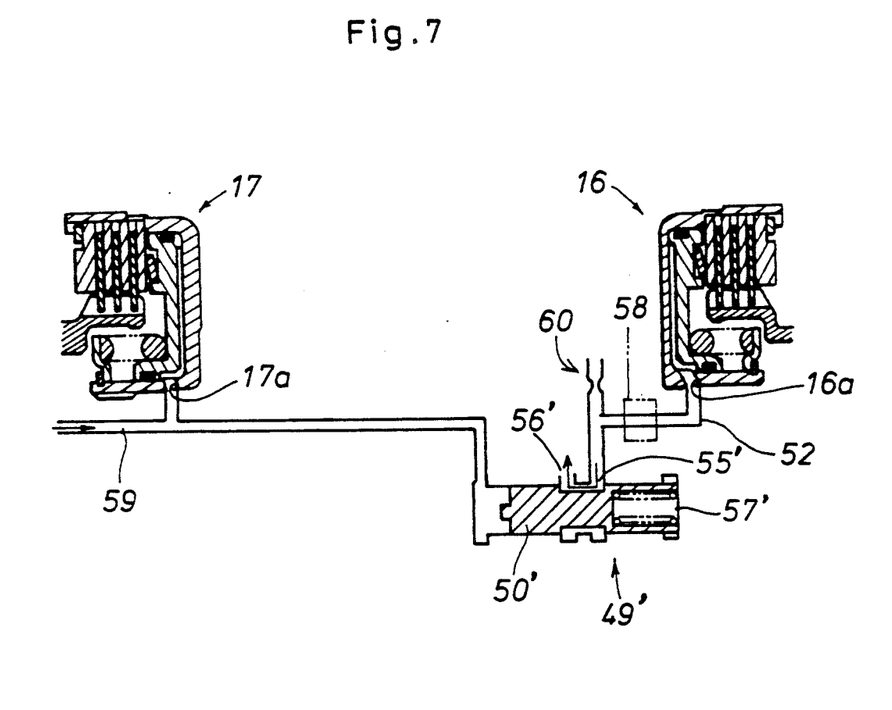
FIG. 7 is a view similar to FIG. 4 showing a conventional hydraulic control device for an automatic automotive transmission system.

FIG. 7 shows an exemplary oil ejection control valve 49' which is employed at the time of upshifting from a second speed stage to a third speed stage. This upshift operation is carried out by supplying oil pressure from a conduit 59 to a third speed clutch 17 via a port 17a leading to an oil chamber of this clutch, and ejecting oil from an oil chamber of a second speed clutch 16 via a port 16a. The port 16a communicates with a fixed orifice 60 via a conduit 52 when a 2-3 shift valve 58 is opened as a result of the upshift operation. The oil ejection control valve 49' is provided with a spool valve member 50' which is normally biased by a spring 57' to a position to close the communication between an inlet port 55' connected to the conduit 52 and an outlet port 56' connected to a pressure sink or an oil reservoir. However, the pressure supplied to the conduit 59 acts upon the spool valve member 50' and urges it to a position to establish a communication between the inlet port 55' and the outlet port 56'.

Therefore, according to this hydraulic circuit, before the engagement pressure for engaging the third speed clutch 17 builds up to a certain level, the oil from the oil chamber of the second speed clutch 16 is ejected solely through the fixed orifice 60, and the decrease in the ejection pressure of the second speed clutch 16 is gradual. However, once the engagement pressure for the third speed stage 17 has built up to a certain level, the oil ejection control valve 49' is opened up, and the ejection of oil from the oil chamber of the second speed clutch 16 takes place in an accelerated fashion.

Thus, according to the prior art oil ejection control valve, the disengagement of the second speed clutch 16 is initially gradual, and is then accelerated in a later stage of the upshift operation so that a substantially transmission shock was inevitable. In particular, when the oil ejection control valve is so designed to minimize the transmission shock under a relatively heavy load condition as is usually the case, a significant transmission shock occurs when an upshift operation is made under a light load condition.

BRIEF SUMMARY OF THE INVENTION

In view of such problems of the prior art, a primary object of the present invention is to provide an improved hydraulic control device for an automatic automotive transmission system which can reduce the transmission shock in all conditions.

A second object of the present invention is to provide an improved hydraulic control device for an automatic automotive transmission system which can reduce the transmission shock in the downshift operation with the accelerator pedal depressed.

A third object of the present invention is to provide an improved hydraulic control device for an automatic automotive transmission system which can reduce the transmission shock in the upshift operation under a light load condition such as an engine brake situation produced by the release of the accelerator pedal.

A fourth object of the present invention is to provide an improved hydraulic control device for an automatic automotive transmission system which can reduce undesirable impulsive striking of gear teeth of two gears which are caused to mesh with each other during a transmission operation.

These and other objects of the present invention can be accomplished by providing a hydraulic control device for an automatic automotive transmission system in which a speed stage is selected from a plurality of speed stages by ejecting pressure from a first hydraulic engagement element provided in a path of power transmission and supplying pressure to a second hydraulic engagement element provided in another path of power transmission, comprising: an oil ejection passage connected to a port of an oil chamber of the first hydraulic engagement element; an oil ejection control valve having an inlet port connected to the oil ejection passage, an outlet port connected to an oil reservoir, a valve member, spring means urging the valve member to a position to substantially close a communication between the inlet port and the outlet port, a first pressure input port for applying pressure to a first pressure receiving surface of the valve member to move the valve member in a direction to open a communication between the inlet port and the outlet port against a biasing force of the spring means, and a second pressure input port for applying pressure to a second pressure receiving surface of the valve member to move the valve member in a direction to open a communication between the inlet port and the outlet port against a biasing force of the spring means; an ejection pressure oil passage connected between a port of an oil chamber of the first hydraulic engagement element and the first pressure input port of the oil ejection control valve; and a supply pressure oil passage connected between a port of an oil chamber of the second hydraulic engagement element and the second pressure input port of the oil ejection control valve.

When the present invention is applied to the case of a downshift operation, for instance, a kick-down operation from a fourth speed stage to a second speed stage, since the movement of the valve member of the oil ejection control valve for adjusting the flow resistance of the oil ejection passage of the hydraulic engagement element for the high speed stage is controlled by both the pressure ejected from the hydraulic engagement element for the high speed stage and the pressure supplied to the hydraulic engagement element for the low speed stage during the downshift operation with the accelerator pedal depressed, the valve member can be moved with the high ejection pressure from the hydraulic engagement element for the high speed stage in an initial part of the transmission operation, and with the rising pressure supplied to the hydraulic engagement element for the low speed stage in a later part of the transmission operation to make up for the reduction in the pressure ejected from the hydraulic engagement element for the high speed stage. Therefore, it is possible to promptly reduce pressure from the hydraulic engagement element for the high speed stage in an initial part of the transmission operation, and the subsequent reduction of the engagement pressure can be carried out without involving any abruptness.

Likewise, when the present invention is applied to the case of an upshift operation, since the movement of the valve member of the oil ejection control valve for adjusting the flow resistance of the oil ejection passage of the hydraulic engagement element for the low speed stage is controlled by both the pressure supplied to the hydraulic engagement element for the high speed stage and the pressure ejected from the hydraulic engagement element for the low speed stage during the upshift operation from the low speed stage to the high speed stage, the oil pressure for the low speed stage is reduced in proportion to the increase in the engagement pressure for the high speed stage, and the opening movement of the valve member can be controlled by a relatively smoothly changing force which combines the contributions from these two pressures.

Further, by using a switch valve which switches over according to the magnitude of the engine load, and driving the valve member with the supply pressure for the high speed stage alone when the engine load is relatively great, and with the combination of the supply pressure and the ejection pressure when the engine load is relatively light, for instance in an engine brake situation, an optimum control of the transmission operation can be accomplished in each of the different conditions.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
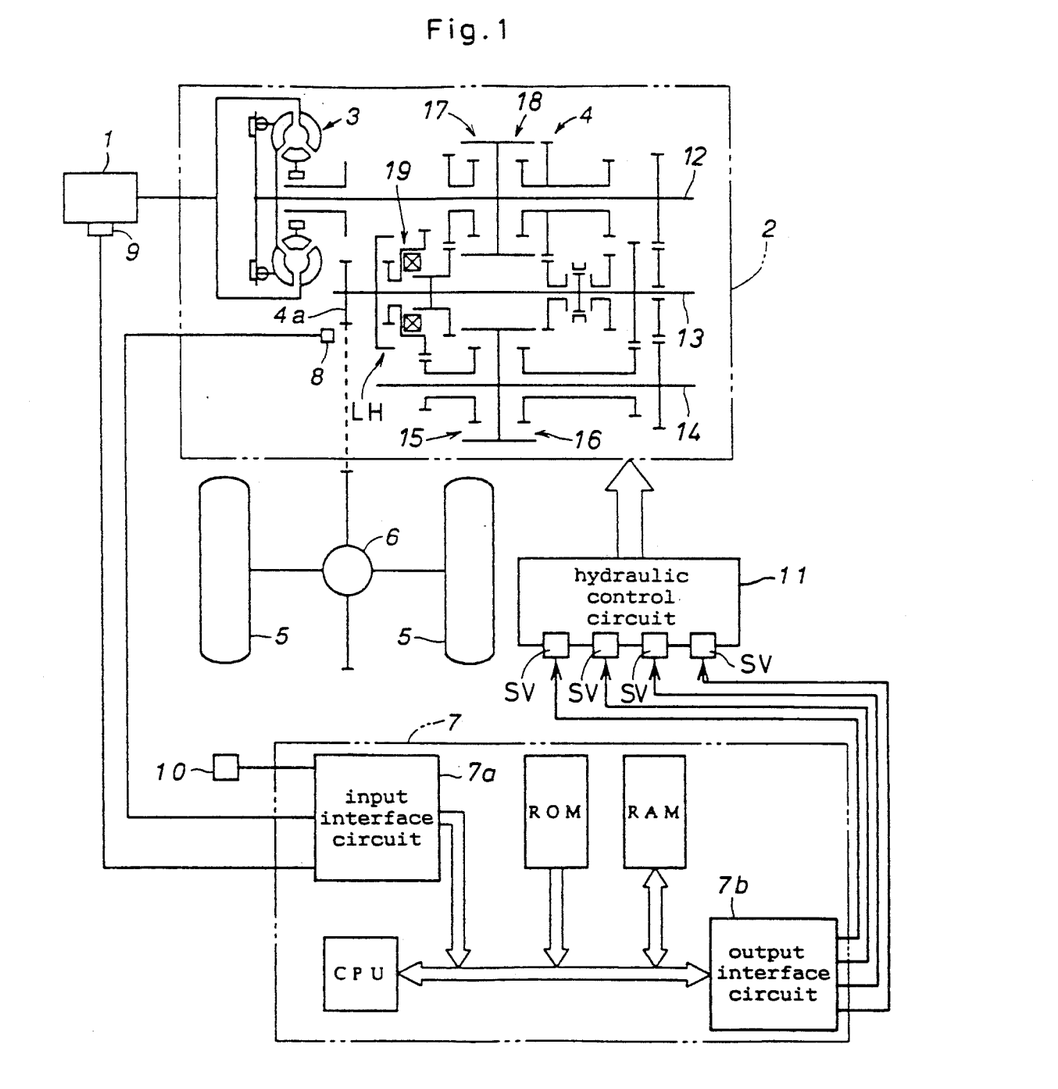
FIG. 1 is a schematic diagram showing the overall structure of an automatic automotive transmission system to which the present invention is applied.

Referring to FIG. 1 which is a schematic view showing an automatic automotive transmission system to which the present invention is applied, an automatic transmission system 2 is attached to an internal combustion engine 1, and this automatic transmission system 2 comprises a torque converter 3 having a lock-up clutch and a gear transmission unit 4 with four forward speed stages and one reverse speed stage equipped with a hold clutch. A ring gear of a differential gear unit 6 coupled to driven wheels 5 meshes with a final drive gear 4a of the gear transmission unit 4 so that the output torque of the engine 1 may be transmitted to the driven wheels 5 via the torque converter 3 and the gear transmission unit 4.

The speed stages of the automatic transmission system 2 are controlled by a control unit 7 serving as a means for controlling the automatic transmission operation according to a vehicle speed signal and a throttle opening signal representing the load condition of the engine. The control unit 7 operates electronically, and comprises a CPU, ROM, RAM and input and output interface circuits 7a and 7b. The input interface circuit 7a receives a pulse signal from a vehicle speed sensor 8 associated with the final drive gear 4a as a vehicle speed signal, and a voltage signal from a throttle opening sensor 9 mounted on a throttle body not shown in the drawing as a throttle opening signal. The input interface circuit 7a may further receive signals from other sensors 10 which, for instance, detect the condition of an air conditioner, and the temperature of the engine cooling water.

The CPU of the control unit 7 carries out a map control for the operation of the automatic transmission system 2 by using the CPU, the ROM and the RAM according to the signals supplied to the input interface circuit 7a. The output interface circuit 7b of the control unit 7 supplies a shift control signal and a lock-up control signal to various solenoid valves SV for shift control and lock-up control of an hydraulic control circuit 11 of the automatic transmission system 2. The hydraulic control circuit 11 automatically shifts the gears of the gear transmission unit 4 of the automatic transmission system 2 as required.

This gear transmission unit 4 consists of, for instance, a constant-mesh type transmission gear unit having an input shaft 12, an output shaft 13 and a counter shaft 14 disposed in a mutually parallel relationship. The counter shaft 14 which is engaged with the input shaft 12 by means of gears including idle gears is provided with a first speed clutch 15 for establishing the first speed stage, and a second speed clutch 16 for establishing the second speed stage, and the input shaft 12 is provided with a third speed clutch 17 for establishing the third speed stage, and a fourth speed clutch 18 for establishing the fourth speed stage. The output shaft 13 is provided with a one-way clutch 19 coupled to a first speed gear for permitting the overrunning of the output shaft 13, and the transmission of torque via the first speed gear is avoided. Therefore, when a speed stage other than the first speed stage is established, torque is transmitted to the output shaft 13 without the intervention of the one-way clutch 19. A hold clutch LH is provided in parallel with the one-way clutch 19 so that torque may be transmitted by the hold clutch LH by overriding the one-way clutch 19 when the hold clutch LH is engaged.

Figure 2:
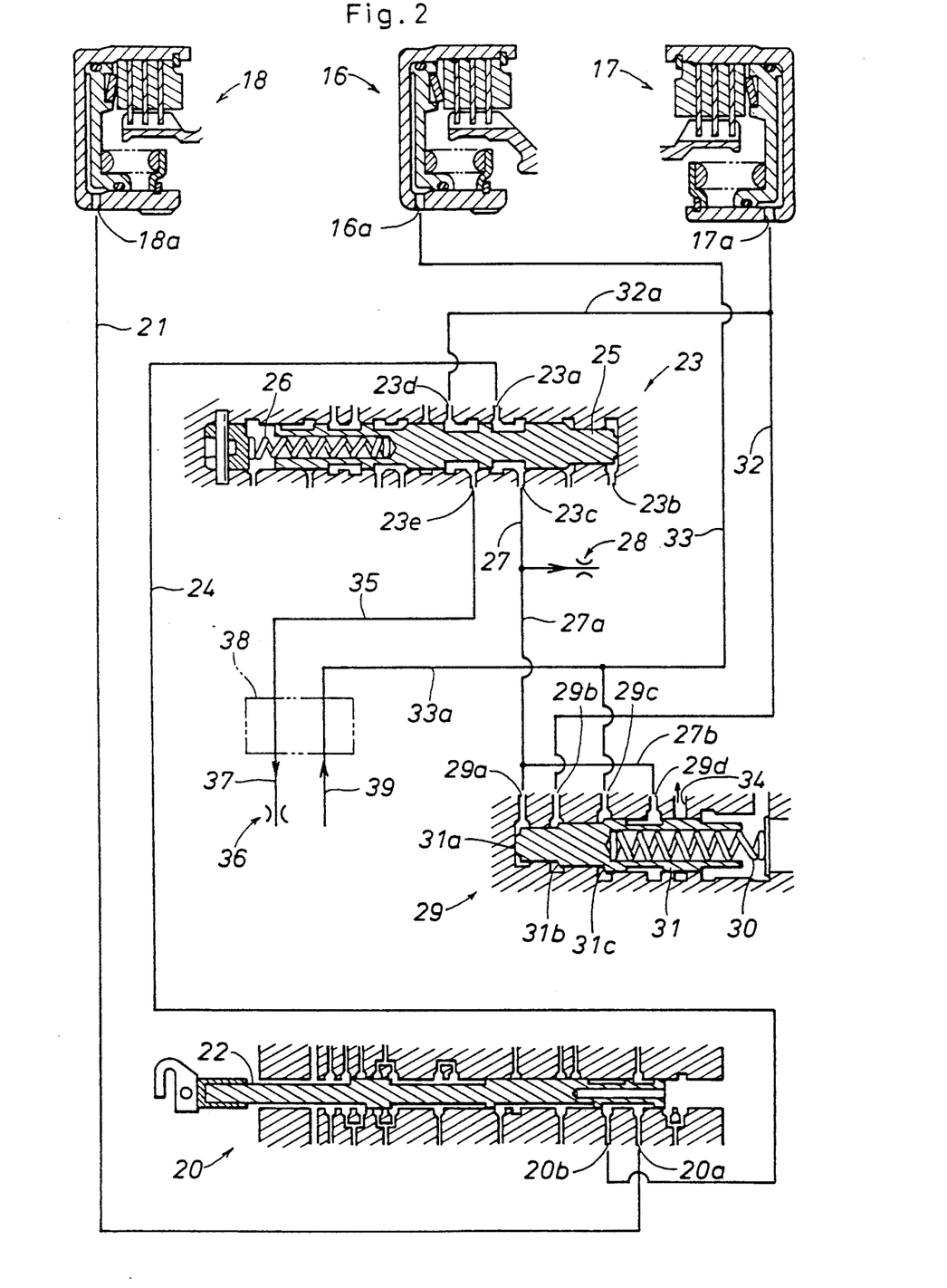
FIG. 2 is a schematic hydraulic circuit diagram of an essential part of a first embodiment of the hydraulic control device for the automatic automotive transmission system according to the present invention.

FIG. 2 is a schematic hydraulic circuit diagram of an essential part of the hydraulic control circuit 11 to which the present invention is applied.

In this drawing, a port 18a leading to an oil chamber of the fourth speed clutch 18 is communicated with a first port 20a of a manual valve 20 via a first oil passage 21. This manual valve 20 has a spool valve member 22 which can move laterally as seen in the drawing, and, in this illustrated condition in which a D range is selected, any one of the first through the fourth speed stages may be automatically established by suitable shifting operations. In the illustrated condition, a second port 20b of the manual valve 20 communicating with the first port 20a via an annular groove formed in the spool valve member 22 is communicated with a first port 23a of a 3-4 shift valve 23 via a second oil passage 24. A spool valve member 25 of this 3-4 shift valve 23 is elastically biased to the right in the drawing by a spring 26. In the drawing, a low speed stage or the second speed stage is achieved after the vehicle has been travelling in a high speed stage or the fourth speed stage, and, when the second speed stage is achieved, an oil chamber remote from the spring 26 does not receive any oil pressure from a control valve not shown in the drawing via a second port 23b, and the spool valve member 25 is elastically biased to the right under the biasing force of the spring 26 as shown in the drawing.

The 3-4 shift valve 23 is provided with a third port 23c which communicates with the first port 23a via an outer circumferential groove formed in the spool valve member 25 when the second speed stage is achieved, and the third port 23c is connected to a first oil ejection passage 27 which communicates with the atmosphere via a fixed orifice 28.

A branch passage 27a branching out from an intermediate part of the first oil ejection passage 27 upstream of the fixed orifice 28 is connected to a first input port 29a of an oil ejection control valve 29. The ejection oil pressure supplied to the first input port 29a is applied to a first annular land 31a of a spool valve member 31 of the oil ejection control valve 29 so that the spool valve member 31, which is biased to the left in the drawing by a spring 30, may be displaced to the right against the spring biasing force by the ejection pressure supplied to the first input port 29a. The oil ejection control valve 29 is provided with second through fourth input ports 29b through 29d, and the second input port 29b is connected to a port 17a leading to an oil chamber of the third speed clutch 17, via a third oil passage 32, while the third input port 29c is connected to a port 16a leading to an oil chamber of the second speed clutch 16, via a fourth oil passage 33, in such a manner that the ejection pressures may be applied to second and third annular lands 31b and 31c of the spool valve member 31, and the ejection pressures selectively supplied to the two ports 29b and 29c may displace the spool valve member 31 against the spring biasing force.

A secondary branch passage 27b branching further out from the branch passage 27a is connected to the fourth input port 29d of the oil ejection control valve 29, and the oil ejection control valve 29 is provided with an oil ejection port 34 which communicates with the fourth input port 29d via an outer circumferential groove of the spool valve member 31 when the spool valve member 31 is displaced to the right in the drawing against the spring biasing force.

A fourth port 23d of the 3-4 shift valve 23 is connected to a branch passage 32a which branches out from a third oil passage 32 connected to the port 17a of the third speed clutch 17. The 3-4 shift valve 23 is provided with a fifth port 23e which communicates with the fourth port 23d via an outer circumferential groove of the spool valve member 31 when the spool valve member 31 is in the illustrated position, and a fifth oil passage 35 connected to this fifth port 23e is selectively communicated with a second oil ejection passage 37 communicating with the atmosphere via a fixed orifice 36. A branch passage 33a branching out from the fourth oil passage 33 is selectively connected to an oil supply passage 39 connected to an oil supply pump not shown in the drawing by way of a 2-3 shift valve 38.

In the hydraulic control circuit having the above described structure, when a downshift transmission operation is to be made from the fourth speed stage to the second speed stage, the engagement pressure in the oil chamber of the fourth speed clutch 18 is removed, and the clutch is disengaged from its engaged condition. The removal of the engagement pressure is made via the first oil ejection passage 27 according to the condition of communication between the first and the third ports 23a and 23c of the 3-4 shift valve 23. Initially, the engagement pressure is removed via the fixed orifice 28 alone, and, since the ejection oil pressure is applied to the first land 31a via the first input port 29a of the oil ejection control valve 29 and the branch passage 27a, the spool valve member 31 is displaced to the right in the drawing against the elastic biasing force of the spring 30. At this time, by the activation of the 2-3 shift valve 38 as described above, pressure is supplied to the oil chamber of the second speed clutch 16 so as to engage the same, and this engagement pressure is also applied to the third land 31c via the third input port 29c. The rise and fall of the two oil pressures occurs as indicated by the clutch oil pressure line P4 for the ejection pressure of the fourth speed clutch 18 and the clutch oil pressure line P2 for the supply pressure of the second speed clutch 16 in the upper part of FIG. 3.

According to the present invention, the drive force F which urges the spool valve member 31 of the oil ejection control valve 29 in the direction to open the oil ejection port 34 so as to release oil pressure from the clutch 18 for the fourth speed stage is given as a sum of the product of the ejection pressure P4 of the fourth speed clutch 18 and the area Sa of the first land 29a which receives this pressure and the product of the supply pressure P2 of the second speed clutch 16 and the area Sb of the second land 29b which receives this pressure ($F = P4 \cdot Sa + P2 \cdot Sb$). When the drive force F becomes larger than the spring force of the spring 30 which urges the spool valve member 31 in the direction to close the oil ejection port 34, the fourth input port 29d communicates with the oil ejection port 34, and the engagement pressure of the fourth speed clutch is removed in an accelerated fashion.

Thus, immediately after the start of the downshift transmission operation, since the engagement pressure of the second speed clutch 16 for the low speed stage is low, and the movement of the spool valve member 31 in the direction to open the valve takes place primarily due to the ejection pressure of the fourth speed clutch 18 for the high speed stage which has been engaged, the valve is extremely quickly opened as compared to the valve opening action of the prior art which takes place only after the engagement pressure of the second speed clutch 16 has built up to a certain level. Therefore, as indicated by the solid line P4 in the upper part of FIG. 3, the decline in the engagement pressure of the fourth speed clutch 18 for the high speed stage is more quick than that of the prior art which is indicated by the pressure ejection curve in the imaginary line in the upper part of FIG. 3. Further, the decrease in the pressure of the fourth speed clutch 18 takes place in association with the increase in the pressure of the second speed clutch 16 according to the ratio between the areas Sa and Sb of the first land 29a and the second land 29b, and the drive force F can be kept substantially constant by suitably determining the area ratio.

Since the oil ejection control valve 29 operates in a controlled fashion, the engagement pressures of the clutches change in a relatively smooth fashion. Thus, since the transmission torque of the high speed stage is reduced by the decline in the engagement pressure of the clutch for the high speed stage in such a relation to the increase in the transmission torque of the low speed stage by the rise in the engagement pressure of the clutch for the low speed stage that the change in the transmitted torque is minimized during the transmission operation, and the change in the vehicle acceleration is reduced as demonstrated in the lower part of FIG. 3. Thus, the shock due to the shifting operation is minimized. Once the force by the engagement pressure of the second speed clutch 16 which urges the spool valve member 31 in the direction to open the valve overcomes the biasing force of the spring 30, the valve opens up solely by the engagement pressure of the second speed clutch 16 before the engagement pressure of the fourth speed clutch 18 is totally removed.

The above described embodiment pertained to the case of a downshift operation from the fourth speed stage to the second speed stage, but other transmission operations to other speed stages may take place in a similar fashion. For instance, in the case of a downshift transmission operation from the fourth speed stage to the third speed stage, the 2-3 shift valve 38 switches over, and the oil supply passage 39 communicates with the fifth oil passage 35 so as to increase the engagement pressure of the third speed clutch 17. The engagement pressure of the third speed clutch 17 is supplied to the afore-mentioned second port 29b of the oil ejection control valve 29, and acts upon the second land of the spool valve member 31. Therefore, in the initial part of the transmission operation, the oil ejection control valve 29 opens up more speedily by the ejection pressure from the fourth speed clutch 18, and, even when the ejection pressure has declined, the opening of the valve is maintained by the rise in the engagement pressure of the third speed clutch 17 so that a smooth transmission operation is ensured in a similar manner as in the previously described embodiment.

As described above, since the removal of pressure from the hydraulic engagement element for the high speed stage is carried out while controlling the opening operation of the oil ejection control valve with a relatively smoothly changing drive force for moving the valve member in the direction to open the valve by combining the rise and fall of the supply pressure to the hydraulic engagement element for the low speed stage and the ejection pressure from the hydraulic engagement element for the low speed stage during a transmission operation from the high speed stage to the low speed stage, the change in the ejection pressure can be mitigated, and the quality of the transmission operation can be improved by reducing the transmission shock during a downshift operation such as a kick-down operation.

Now, referring to FIG. 1 again, in this transmission gear unit, when an upshift operation is to be made, for instance, from the second speed stage to the third speed stage, the second speed clutch 16 is disengaged so as to place the gear for the second speed stage mounted in a freely rotatable manner on the corresponding shaft in a freely rotatable condition while the third speed clutch 17 is engaged so as to fixedly secure the gear for the third speed stage mounted in a freely rotatable manner on the corresponding shaft to this shaft and allow it to transmit torque. In this manner, each of the speed stages may be established by selectively engaging and disengaging appropriate clutches.

Figure 4:
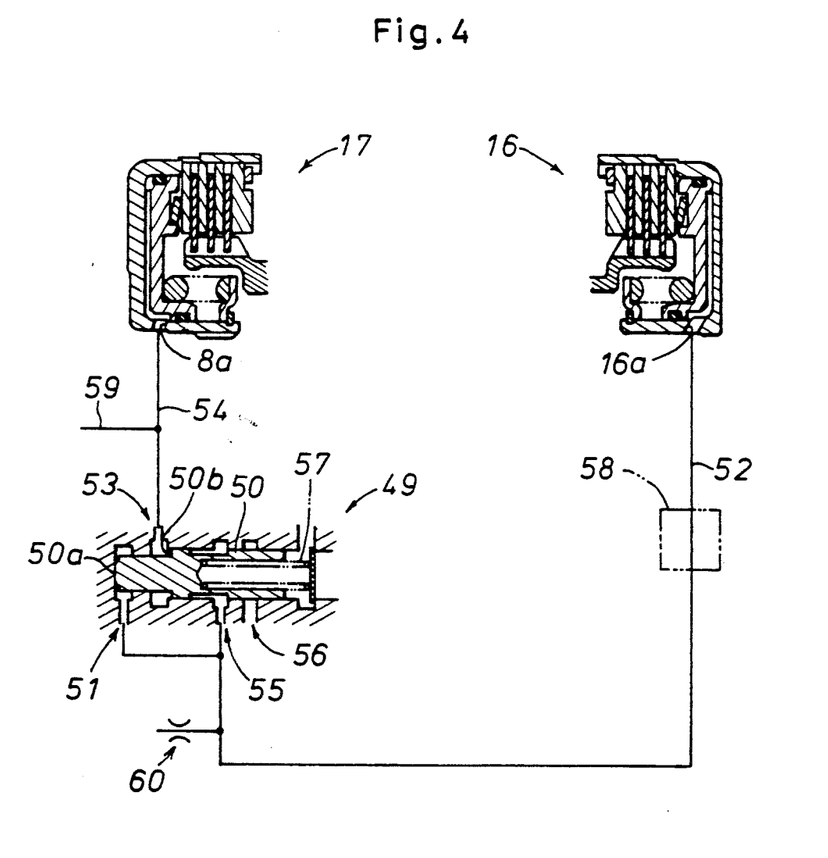
FIG. 4 is a view similar to FIG. 2 showing an essential part of a second embodiment of the hydraulic control device for the automatic automotive transmission according to the present invention.

Referring to FIG. 4, the port 16a of the oil chamber of the second speed clutch 16 is communicated with a first input port 51 of an oil ejection control valve 49 via a first oil passage 52, and a second input port 53 of the oil ejection control valve 49 is communicated with the port 17a of an oil chamber of the third speed clutch 17 via a second oil passage 54. The first oil passage 52 is also communicated with a third input port 55 of the oil ejection control valve 49. This oil ejection control valve 49 is provided with a spool valve member 50 which can move back and forth so as to selectively communicate the input port 55 to an oil ejection port 56 of the oil ejection control valve 49, and is elastically urged by a spring 57 in the direction to close the oil ejection port 56. The valve member 50 is provided with a first annular pressure receiving surface 50a to which the oil pressure supplied to the first input port 51 is applied, and a second annular pressure receiving surface 50b to which the pressure supplied to the second input port 53 is applied. When oil pressures are applied to these two pressure receiving surfaces 50a and 50b, the valve member 50 is displaced to the right in the drawing against the elastic biasing force of the spring 57, and communicates the third input port 55 with the oil ejection port 56.

The first oil passage 52 is provided with a 2-3 shift valve 58 in an intermediate part thereof, and the activation of the 2-3 shift valve 58 causes the port 16a of the second speed clutch 16 to be communicated with the first and third input ports 51 and 55 of the oil ejection control valve 49. A branch passage 59 provided in an intermediate part of the second oil passage 54 is provided with a 3-4 shift valve not shown in the drawing, and the activation of this 3-4 shift valve causes oil pressure to be supplied to and ejected from the oil chamber of the third speed clutch 17 in a similar manner as described above.

In this hydraulic control circuit having the above described structure, when an upshift operation is made from the second speed stage to the third speed stage, engagement oil pressure is supplied to the oil chamber of the third speed clutch 17 to engage the same from its disengaged state. The oil pressure is supplied through the branch passage 59 as described above, and the oil pressure supplied to the second input port 53 is applied to the second pressure receiving surface 50b so that the valve member 50 moves to the right in the drawing against the elastic biasing force of the spring 57. At the same time, since the activation of the above described 2-3 shift valve 58 causes the oil pressure of the oil chamber of the second speed clutch 16 to be supplied to the first and third input ports 51 and 55, the oil pressure supplied to the first input port 51 is applied to the first pressure receiving surface 50a and urges the valve member 50 in a similar fashion. The rise and fall of the two oil pressures are brought about as indicated by the ejection pressure line A of the second speed clutch 16 and the supply pressure line B of the third speed clutch 17, respectively, in the upper part of FIG. 5.

According to the present invention, the drive force F which urges the valve member 50 of the oil ejection control valve 49 in the direction to open the oil ejection port 56 so as to release oil pressure from the second speed clutch 16 is given as a sum of the product of the ejection pressure Pa indicated by the ejection pressure line A and the area Sa of the first pressure receiving surface 50a formed as a land in the valve member 50 and the product of the supply pressure Pb indicated by the supply pressure line B and the area Sb of the second pressure receiving surface 50b formed as another land in the valve member 50 ($F = Pa \cdot Sa + Pb \cdot Sb$). When the drive force F becomes larger than the spring force which urges the valve member 50 in the direction to close the oil ejection port 56, the third input port 55 communicates with the oil ejection port 56.

Thus, immediately after the start of the transmission operation, the engagement pressure of the clutch 17 for the higher speed stage or the third speed stage is low, and the displacement of the valve member 50 is caused primarily by the high ejection oil pressure from the clutch 16 for the lower speed stage or the second speed stage so as to rapidly reduce the engagement oil pressure of the second speed clutch 16. Thereafter (or following the point P in the drawing), the engagement oil pressure of the second speed clutch 16 is reduced more gradually than the prior art which is indicated in the imaginary line in the upper part of FIG. 5 according to the rise in the engagement oil pressure of the third speed clutch 17 and the ratio of the areas of the pressure receiving surfaces 50a and 50b.

Figure 5:
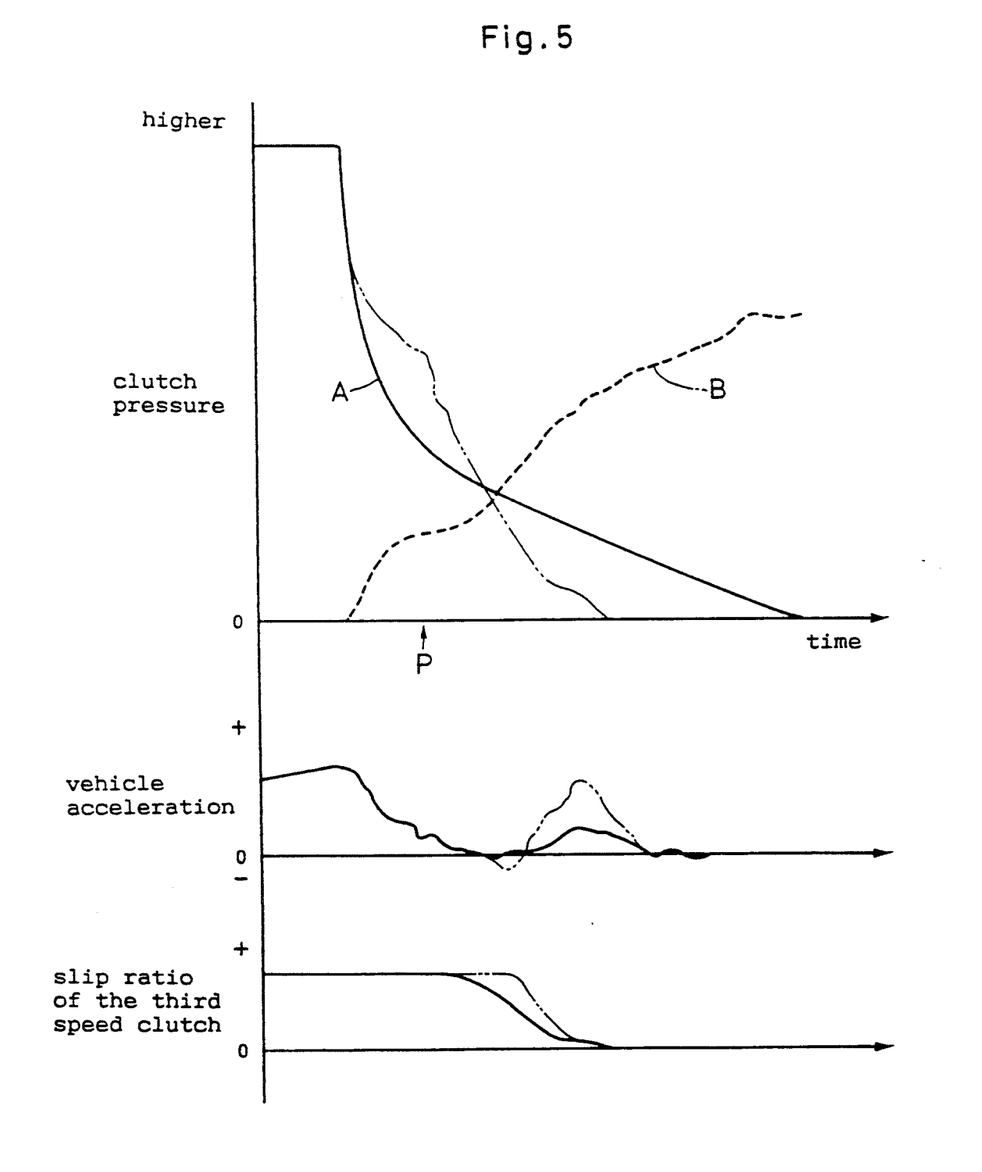
FIG. 5 is a diagram showing the transmission operation of the second embodiment of the present invention.

Therefore, by the amount of the increase of the engagement force of the third speed clutch 17, the engagement force of the second speed clutch 16 is reduced with the result that the change-over in the role of torque transmission between the two clutches takes place in a smooth manner without any sudden change in the transmitted torque, and the transmission shock can be substantially reduced. In particular, in a power-off upshift transmission operation in which a change in the transmitted torque tends to be a problem, a particularly significant reduction in the transmission torque can be effected.

When the vehicle is travelling in the second speed stage with the accelerator pedal depressed to a certain extent, the driven gear for the third speed stage is freely rotating if the drive gear for the third speed stage is fixed to the input shaft 12 or the drive gear for the third speed stage is freely rotating if the driven gear for the third speed stage is fixed to the output shaft 13. In either case, if the engagement force of the second speed clutch 16 is abruptly lost, the play in the meshing engagement of the gears in the third speed stage causes an impulsive sound. When this engagement force is abruptly changed in the prior art transmission system, the slip ratio of the third speed clutch 17 rapidly changes as indicated by the imaginary line in the lower part of FIG. 5, and a substantial impulsive sound is produced. However, according to the present invention, since the second speed clutch 16 is disengaged with the engagement pressure thereof removed via the oil ejection port 56 of the oil ejection control valve 49 in a controlled fashion, the pressure is gradually removed as indicated by the oil ejection line A, and the change in the slip ratio likewise takes place in a gradual manner as indicated by the solid line so that the relative movement of the teeth of the two gears for the third speed stage is subjected to a braking action due to the engagement pressure of the second speed clutch 16 remaining until the completion of the upshift transmission operation, and a favorable transmission operation can be accomplished without involving undesirable impulsive noises.

Figure 6:
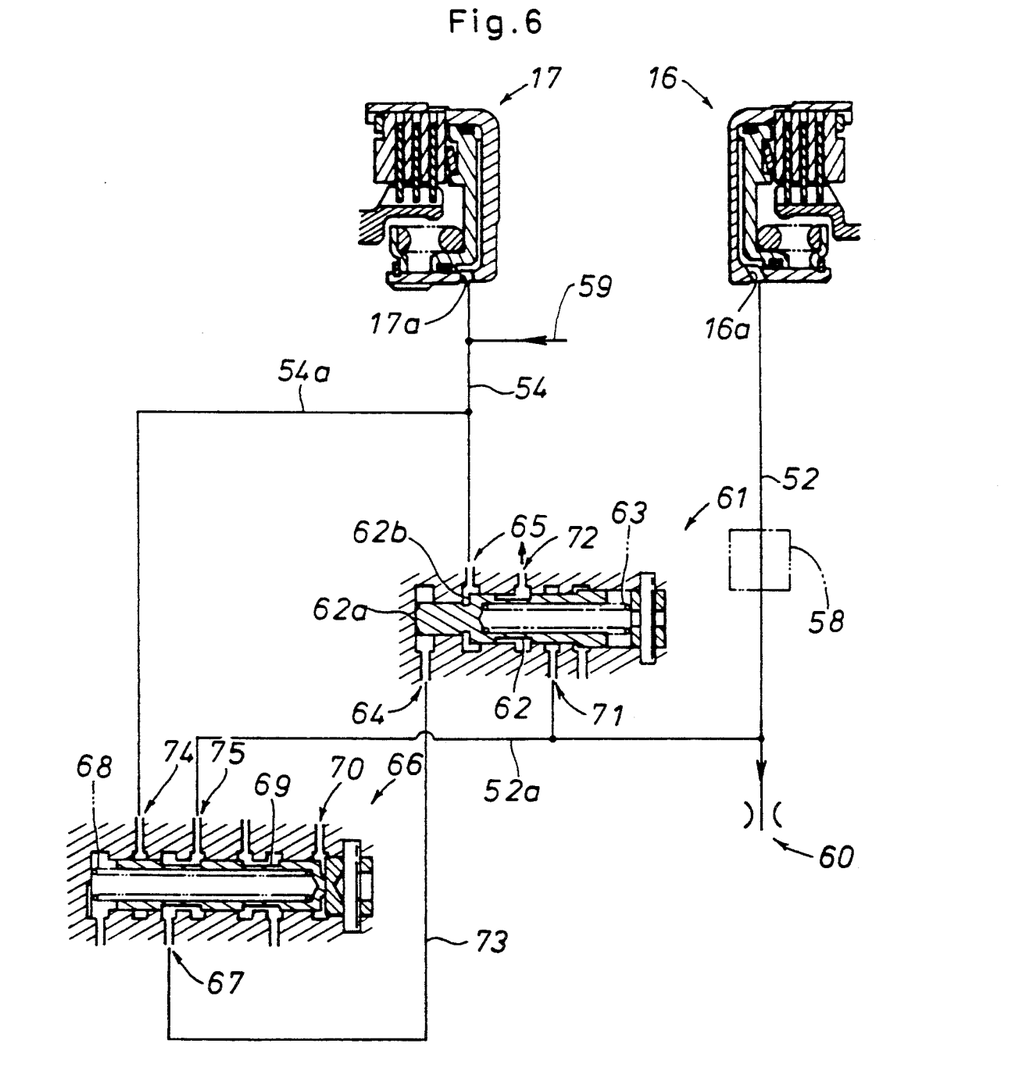
FIG. 6 is a view similar to FIG. 4 showing an essential part of a third embodiment of the hydraulic control device for the automatic automotive transmission system according to the present invention.

FIG. 6 is a view similar to FIG. 4 showing yet another embodiment of the present invention, and like parts are denoted with like numerals without repeating description of such parts. The oil ejection control valve 61 for controlling the removal of oil pressure in this embodiment is provided with an ejection oil inlet port 71 connected to the first oil passage 52, and first and second ports 64 and 65 for moving a valve member 62 against the elastic biasing force of a spring 63. The first port 64 is connected, via a third oil passage 73, to an output port 67 of a switch valve 66 which switches over according to the throttle opening of the throttle valve determined by the amount of accelerator pedal depression relative to a prescribed value, and the second port 65 is connected to the port 17a of the third speed clutch 17 via the second oil passage 54. The switch valve 66 is provided with a supply pressure input port 74 and an ejection pressure input port 75. The supply pressure input port 74 is connected to a branch passage 54a branching out from the second oil passage 54, and the ejection pressure input port 75 is connected to a branch passage 52a of the first oil passage 52.

When a valve member 69 of the switch valve 66 is biased by a spring 68 as illustrated in the drawing, the throttle opening of the throttle valve is below a prescribed value or an engine brake condition exits with the accelerator pedal being released, and, in this case, the port 16a of the second speed clutch 16 is communicated with the output port 67 while the port 17a of the third speed clutch 17 is shut off from the output port 67. Conversely, when the throttle opening is larger than the prescribed value and a signal pressure from the throttle valve is applied to a signal pressure input port 70 so as to move the valve member 69 to the left in the drawing against the biasing force of the spring 68, the port 17a of the third speed clutch 17 is communicated with the output port 67 while the port 16a of the second speed clutch 16 is shut off from the output port 67.

Further, when the valve member 62 of the oil ejection control valve 61 is biased by the spring 63, the ejection oil inlet port 71 connected to the port 16a of the second speed clutch 16 is shut off from an oil ejection port 72. The valve member 62 is provided with first and second pressure receiving surfaces 62a and 62b in a similar manner as in the previous embodiment, and, when the valve member 62 is moved to the right in the drawing against the elastic biasing force by the pressures applied to the pressure receiving surfaces, the ejection oil inlet port 71 is communicated with the ejection oil port 72.

In this embodiment, when an upshift transmission operation is made under a light engine load condition, and the throttle opening is below the prescribed level, an engine brake condition exists and the switch valve 66 is in the illustrated condition. In this case, since the driving force urging the valve member 62 in the direction to communicate the ejection oil inlet port 71 with the oil ejection port 72 changes in the same way as in the embodiment illustrated in FIG. 4 according to a combination of the engagement pressure of the third speed clutch 17 which is always applied to the second pressure receiving surface 62a via the second port 65 and the ejection pressure from the second speed clutch 16 applied to the first pressure receiving surface 62a via the first port 64 depending on the above described condition of the switch valve 66, the same result is produced. When an upshift transmission operation is made under a heavy engine load condition in which the throttle opening is above the prescribed level, the engagement pressure of the third speed clutch 17 is applied to the first pressure receiving surface 62a via the first port 64, and the engagement pressure of the third speed clutch 17 is always applied to the second pressure receiving surface 62b, and the driving force of the valve member 62 changes only according to the changes in the engagement pressure of the third speed clutch 17.

Therefore, it is possible to reduce the transmission shock in a manner adapted to a heavy engine load condition in the same way as in the prior art control device, and, additionally, to reduce the transmission shock under a light load condition which tends to be a significant problem.

The switch valve 66 consisted of a hydraulic valve which switches over according to the throttle pressure determined by the throttle opening of the throttle valve, but may also be a solenoid valve which switches over according to an electric signal related to the throttle opening.

According to the present invention, since an upshift transmission operation from the low speed stage to the high speed stage is made by controlling the movement of a valve member of an ejection oil control valve in the direction to open an oil ejection passage with a valve member driving force which changes relatively smoothly by combining the rise and fall of the supply pressure to a hydraulic engagement element for the high speed stage and the ejection pressure from a hydraulic engagement element for the low speed stage, the change in the ejection oil pressure can be mitigated, and the transmission shock at the time of an upshift transmission operation under a light engine load condition can be reduced. Further, by using a switch valve which switches over according to the level of the engine load in relation with a prescribed level, it is possible to drive the valve member according to the supply pressure for the high speed stage when the engine load is relatively large and according to both the changes in the supply pressure and the ejection pressure in the same way as described above when the engine load is light such as the time of an engine brake condition so that the transmission shock may be reduced in each of the cases, and the overall quality of the transmission operation may be improved.

Although the present invention has been described in terms of preferred embodiments thereof, it is obvious to a person skilled in the art that various alterations and modifications are possible without departing from the scope of the present invention which is set forth in the appended claims.

What we claim is:

1. A hydraulic control device for an automatic automotive transmission system in which a speed stage is selected from a plurality of speed stages by removing pressure from a first hydraulic engagement element provided in a path of power transmission and supplying pressure to a second hydraulic engagement element provided in another path of power transmission, comprising:
    an oil ejection passage connected to a port of an oil chamber of said first hydraulic engagement element;
    an oil ejection control valve having an inlet port connected to said oil ejection passage, an outlet port connected to an oil reservoir, a valve member, spring means urging said valve member to a position to substantially close a communication between said inlet port and said outlet port, a first pressure input port for applying pressure to a first pressure receiving surface of said valve member to move said valve member in a direction to open a communication between said inlet port and said outlet port against a biasing force of said spring means, and a second pressure input port for applying pressure to a second pressure receiving surface of said valve member to move said valve member in a direction to open a communication between said inlet port and said outlet port against a biasing force of said spring means;
    an ejection pressure oil passage connected between a port of an oil chamber of said first hydraulic engagement element and said first pressure input port of said oil ejection control valve; and
    a supply pressure oil passage connected between a port of an oil chamber of said second hydraulic engagement element and said second pressure input port of said oil ejection control valve.

2. A hydraulic control device for an automatic automotive transmission system according to claim 1, wherein said first hydraulic engagement element is a hydraulic engagement element for a higher speed stage while said second hydraulic engagement element is a hydraulic engagement element for a lower speed stage.

3. A hydraulic control device for an automatic automotive transmission system according to claim 2, wherein said higher speed stage and said lower speed stage are two adjacent speed stages.

4. A hydraulic control device for an automatic automotive transmission system according to claim 2, wherein said higher speed stage and said lower speed stage are two speed stages which are separated from each other at least by one intermediate speed stage.

5. A hydraulic control device for an automatic automotive transmission system according to claim 4, wherein said oil ejection control valve is further provided with a third pressure input port for applying supply pressure for a hydraulic engagement element for establishing said intermediate speed stage to a third pressure receiving surface of said valve member so as to move said valve member in a direction to open a communication between said inlet port and said outlet port against a biasing force of said spring means.

6. A hydraulic control device for an automatic automotive transmission system according to claim 1, wherein said first hydraulic engagement element is a hydraulic engagement element for a lower speed stage while said second hydraulic engagement element is a hydraulic engagement element for a higher speed stage.

7. A hydraulic control device for an automatic automotive transmission system according to claim 6, further comprising:
    a switch valve interposed in said ejection pressure oil passage, and having an output port connected to said first pressure input port of said oil ejection control valve, a first input port connected to said port of said oil chamber of said first hydraulic engagement element, and a second input port connected to said port of said oil chamber of said second hydraulic engagement element; and
    means for switching over said switch valve according to a load condition of an engine of the vehicle so that said first pressure receiving surface receives said ejection pressure when the load condition of said engine is lighter than a prescribed level, and otherwise receives said supply pressure.

* * * * *